(12) United States Patent
Edler et al.

(10) Patent No.: US 7,387,474 B2
(45) Date of Patent: Jun. 17, 2008

(54) CUTTING INSERT AND A TOOL FOR CHIP REMOVING MACHINING, AS WELL AS AN ATTACHMENT FOR SUCH TOOLS

(75) Inventors: Daniel Edler, Sandviken (SE); Claes Andersson, Valbo (SE); Jörgen Wiman, Sandviken (SE); Kjell Englund, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/375,589

(22) Filed: Mar. 15, 2006

(65) Prior Publication Data

US 2006/0216121 A1 Sep. 28, 2006

(30) Foreign Application Priority Data

Mar. 16, 2005 (SE) .................................... 0500623

(51) Int. Cl.
*B23P 15/28* (2006.01)
*B26D 1/00* (2006.01)

(52) U.S. Cl. ..................... 407/113; 407/115; 407/66; 407/103

(58) Field of Classification Search ............... 407/113, 407/115, 114, 116, 66, 67
See application file for complete search history.

(56) References Cited

U.S. PATENT DOCUMENTS 3,629,919 A 12/1971 Trevarrow
5,275,633 A 1/1994 Johansson et al.
5,810,518 A 9/1998 Wiman et al.
5,931,613 A 8/1999 Larsson
6,146,060 A 11/2000 Rydberg et al.
6,146,061 A * 11/2000 Larsson ..................... 407/103
6,343,898 B1 * 2/2002 Sjoo et al. .................. 407/101
6,921,234 B2 * 7/2005 Arvidsson et al. .......... 407/103
7,008,148 B2 * 3/2006 Wiman et al. .............. 407/113
2004/0057785 A1 3/2004 Blucher et al.
2004/0067112 A1 4/2004 Blucher et al.

* cited by examiner

*Primary Examiner*—Willmon Fridie
(74) *Attorney, Agent, or Firm*—Drinker Biddle & Reath LLP

(57) ABSTRACT

A cutting insert having a front cutting edge and a connecting surface including male- and/or female-like engagement portions, in order to rigidly secure the cutting insert, a geometrically predetermined reference locus serving as a force-application spot for the clamping of the cutting insert. Simultaneously active engagement portions are of only two types—a first, elongate engagement portion, which is located between the front cutting edge and the reference locus, and a second, elongate engagement means, which is oriented at an angle to the first engagement portion and situated at a greater distance from the front cutting edge than the reference locus. In such a way, it is guaranteed that a tightening force always is applied to the cutting insert in a substantially triangular area, which is defined by the free ends of the engagement portions. Furthermore, a tool for chip removing machining, as well as an attachment, e.g., a shim plate, for such tools is provided.

24 Claims, 7 Drawing Sheets

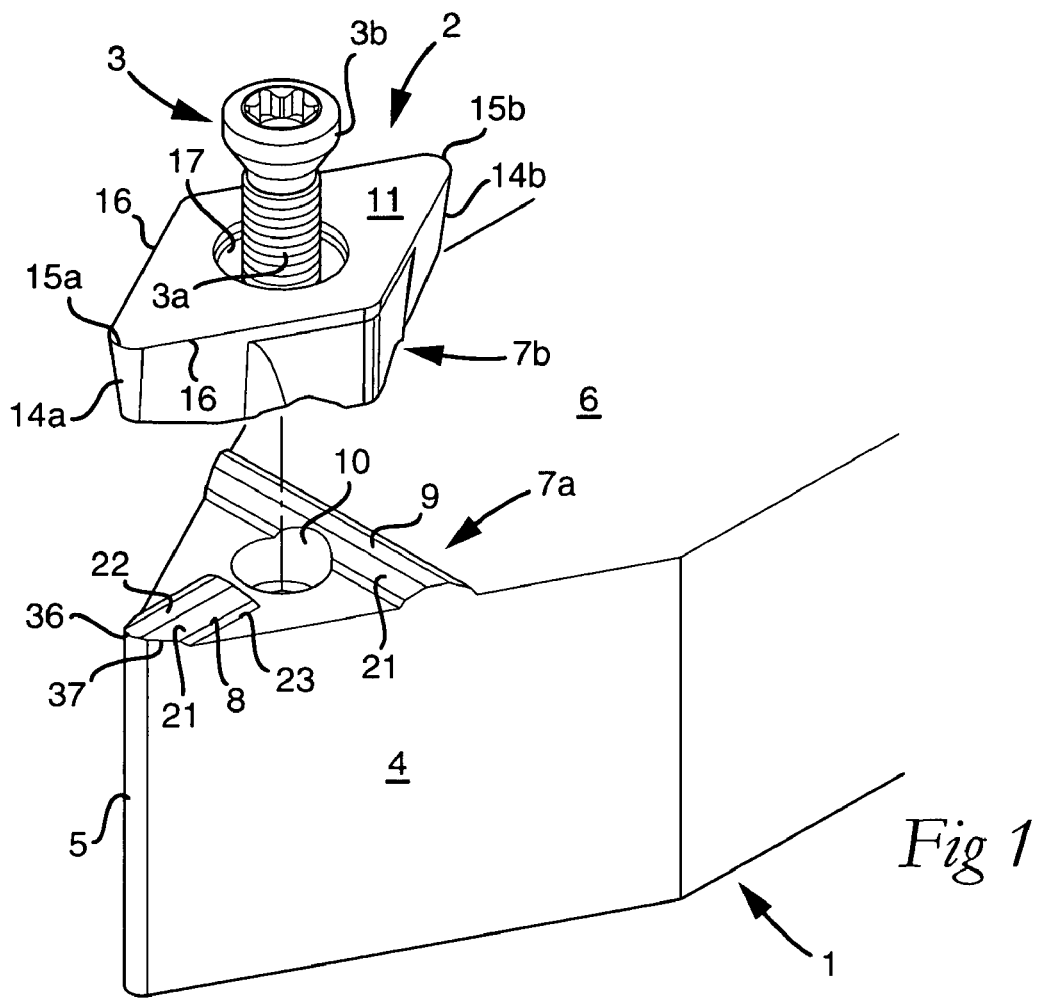
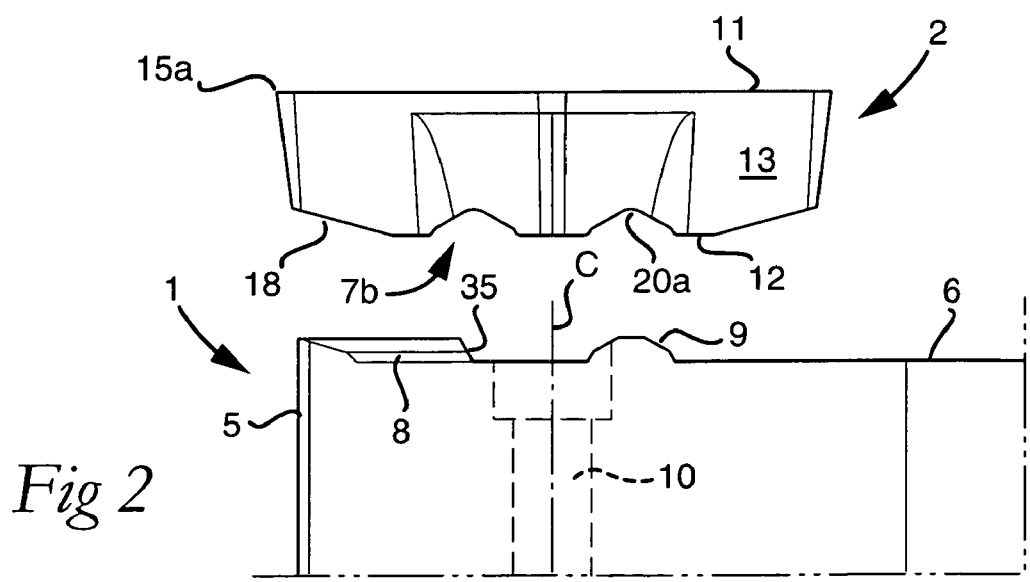

CUTTING INSERT AND A TOOL FOR CHIP REMOVING MACHINING, AS WELL AS AN ATTACHMENT FOR SUCH TOOLS

FIELD OF THE INVENTION

The present invention pertains to a cutting insert intended for chip removal. More particularly, the present invention pertains to a tool for chip removing or cutting machining.

BACKGROUND OF THE INVENTION

Within the art of cutting machining, it has become more and more common to use connecting surfaces of the type that are formed with co-operating male- and female-like engagement portions. Particularly frequently, such connecting surfaces are found in the interface between the basic body of the tool and the replaceable cutting insert or inserts. An earlier, simple type of connecting surface—which by those skilled in the art commonly is denominated "serrations"—is built up by a plurality of conformal, straight and parallel ridges of generally V-like cross-section shape, which are spaced apart by grooves having the same general cross-section shape as the ridges. Therefore, the ridges in one of the two connecting surfaces can engage and be wedged up in the grooves in the other connecting surface, and vice versa.

Connecting surfaces of this type counteract relative motions between the components of the tool in one direction, i.e., perpendicular to the ridges. However, relative motions in the direction parallel to the ridges are not prevented. To overcome this imperfection, recently, connecting surfaces have been developed that include not only a certain a number of parallel, longitudinal ridges or male-like engagement portions, but also one or more transverse ridges. The object of such connecting surfaces—which by those skilled in the art usually are denominated "cross serrations"—is to lock the components of the tool also in the other co-ordinate direction. In such a way, turning of the cutting insert is counteracted. Examples of cutting tools featuring connecting surfaces having oblique or crossing engagement portions in the form of male- and female-like, respectively, engagement portions, are disclosed in, among others, U.S. Pat. No. 3,629,919, U.S. Pat. No. 5,810,518, U.S. Pat. No. 5,931,613 and U.S. Pat. No. 6,146,060.

Common to earlier known connecting surfaces of the type generally mentioned above, is that they include a comparatively great number of pairs of co-operating flanks, which should be brought into contact with each other when connection of two tool components is carried out. As a representative example of this, reference is made to the above-mentioned U.S. Pat. No. 5,931,613, which accounts for a cutting tool, the cutting insert and insert seat of which are formed with connecting surfaces, each one of which includes no less than five pairs of active, i.e., actively contactable, flanks. Clamping of the cutting insert in the insert seat of the basic body is carried out by means of a screw, which is inserted through a hole in the cutting insert, and is tightened in a threaded hole present in the basic body and mouthing in the insert seat. The tightening force that the screw applies to the cutting insert is accordingly applied in a reference locus, which is defined by the common, geometrical center axis of the screw and the holes. Of the five active flank pairs in the respective connecting surfaces, two are situated in front of the center axis, i.e., in an area between the same and an active, front edge of the cutting insert, while the other three flank pairs are situated behind the center axis. Of these rear flank pairs, two are mutually parallel and extend in a conceived extension of the two front flank pairs, while the third, rear flank pair is transverse, i.e., extends perpendicularly to the other flank pairs, the transverse flanks being spaced-apart and located on both sides of the center axis.

In theory, the connecting surfaces disclosed in the above-mentioned document offer a good solution to the problem of rigidly securing a cutting insert in an insert seat of a basic body. However, in practice, this solution—as well as similar solutions to the problem, which are based on the use of a greater number of force-carrying flank pairs—has turned out to be associated with drawbacks difficult to master. Thus, for a satisfactory function, it is required that all flanks not only in the connecting surface of the cutting insert, but also the connecting surface of the basic body, are manufactured with very narrow tolerances in order to guarantee such a good form and dimensional accuracy that the flanks in question de facto obtain force-transferring surface contact with each other. However, as soon as a smallest form defect unintentionally arises in any single flank, there is a risk that the cutting insert cannot be rigidly fixed in the insert seat of the basic body. In other words, the support of the cutting insert against the insert seat becomes over-determined, whereby the precision in respect of the position of the cutting edges in relation to the basic body is lost. In this connection, it should be borne in mind that individual cutting inserts, which constitute a mass produced wear part, never can be tailor-made for individual tools, in that the cutting insert is manufactured somewhere, usually from cemented carbide, while the basic bodies of the tools are manufactured elsewhere and from another material, usually steel.

SUMMARY

The present invention aims at obviating the above-mentioned drawbacks and reducing the requirements on dimensional accuracy in connection with the manufacture of such cutting tools that make use of rigidly securing connecting surfaces in the interface between different components in the tool.

An object of the present invention is to provide a cutting insert that can be manufactured with moderate requirements on dimensional accuracy without renouncing the ability of the cutting insert to be rigidly fixed in a basic body of a tool. An additional object is to provide a cutting insert that becomes self-centering (i.e., by itself, by the nature of the connecting surface, having the ability to seek out the correct position), even if the engagement portions of the contact surfaces have minor form defects or dimensional deviations. Within the scope of the general idea of the invention, it is also an object to provide a cutting insert especially suitable for turning. More precisely, the invention aims at providing a turning insert, the surface-wiping secondary edge or nose edge of which is located reliably in the desired position. It is also an object to provide a cutting insert particularly suitable for rotatable cutting tools, such as milling cutters and drills, which—by analogy with the turning insert—has a connecting surface that in the mounted state guarantees an exact positioning of the active edges of the cutting insert.

The invention is based on the intention of, by suitable design of the connecting surfaces of the cutting insert and of the insert seat, respectively, guaranteeing that the cutting insert obtains what can be said to constitute a three-point abutment. By using neither more nor less than two active, generally elongate engagement portions, preferably in the form of male-like ridges and female-like grooves, and locating the same at an angle to each other, at the same time as the reference locus in which a tightening force is applied to the cutting insert is located within an imaginary, triangular area, which is delimited by the "free ends" of the engagement portions, it is guaranteed that the co-operating flanks always—i.e., independently of minor form defects in, above all, the cutting insert—obtain a stable surface contact without over-determinations and plays, respectively.

In a first aspect, this invention relates to a cutting insert intended for chip removing machining of the type that includes a front cutting edge, as well as a connecting surface having male- and/or female-like engagement portions having the purpose of securing the cutting insert in a mounted state, a geometrically predetermined reference locus on the cutting insert serving as a force-application spot for the clamping of the same. Simultaneously active engagement portions are of only two types, a first engagement portion, which has a certain length extension and is entirely located between said front cutting edge and the reference locus, and a second elongate engagement portion, which is oriented at an angle to the first engagement portion, and is entirety situated at a greater distance from the front cutting edge than the reference locus.

In a second aspect, the invention also relates to a tool for chip removing or cutting machining. This cutting tool includes a basic body having an insert seat and a cutting insert, which is mountable in the insert seat by means of a tightening element, the cutting insert and the insert seat including co-operating connecting surfaces, each one of which has male- and/or female-like engagement portions having the purpose of securing the cutting insert in the mounted state thereof, and the tightening element defining a geometrically predetermined reference locus in which a tightening force requisite for the clamping of the cutting insert is applied to the cutting insert. Simultaneously active engagement portions in the individual connecting surface are of only two types, a first generally elongate engagement portion, which is located between a front end of the connecting surface and said reference locus, and a second, likewise generally elongate engagement portion, which is oriented at an angle to a length extension of the first engagement portion, and located at a greater distance from said front end than the reference locus.

The tool according to the invention may be realized not only as a turning tool, i.e., a tool that in the active state thereof normally is immovably fixed and the workpiece rotates, but also as a rotary tool for milling and/or drilling. In the last-mentioned case, the workpiece is usually fixed during the machining, while the tool both rotates and is moved in one or more directions in relation to the workpiece.

In a third aspect, the invention also relates to an attachment intended for the tool, for example in the form of a shim plate.

BRIEF DESCRIPTION OF THE DRAWING FIGURES

FIG. 1 is a perspective exploded view showing a cutting tool in the form of a turning tool, a cutting insert being shown spaced-apart from an insert seat in the holder or basic body of the tool.

FIG. 2 is an enlarged detailed side view showing the cutting insert and a front portion of the basic body.

DETAILED DESCRIPTION OF THE PREFERRED EMBODIMENTS

Figure 3:
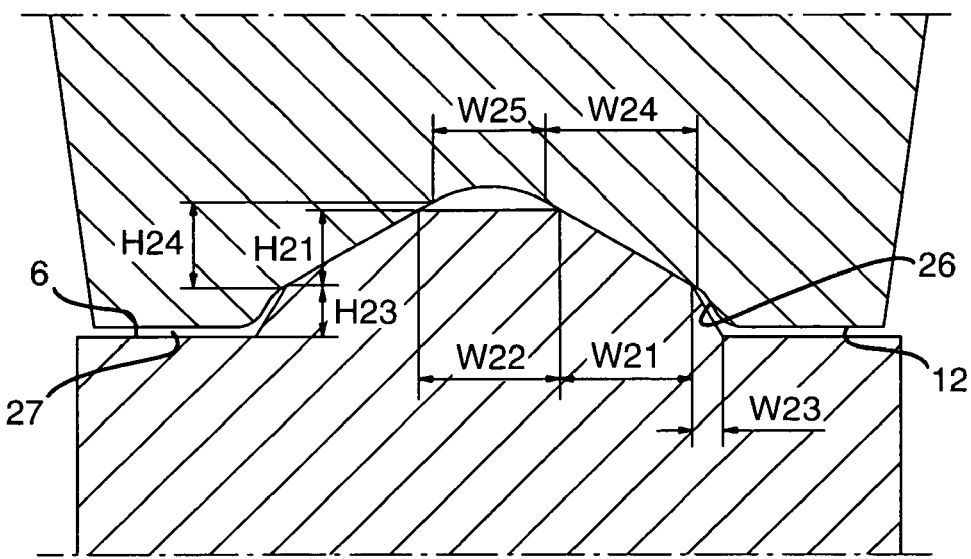
FIG. 3 is a very enlarged section through the interface between the cutting insert and the basic body in the mounted state of the cutting insert.

In FIGS. 1-7, a cutting tool is shown in the form of a turning tool, which in a conventional way includes a holder or basic body 1, as well as a cutting insert 2. For the fixation of the cutting insert, a tightening element 3 is used, which in the example is in the form of a screw, but which also could be a clamp. A front, free end of the basic body 1 tapers, via converging side surfaces 4, wedge-shapedly toward a nose 5. On the top side 6 of the basic body, which in this case is planar, a connecting surface, in its entirety designated 7a, is formed, which forms a so-called insert seat for the cutting insert 2. In the connecting surface 7a, engagement portions 8, 9 are included, which in this case are male-like. Furthermore, it should be noted that a threaded hole 10 mouths in the connecting surface.

The cutting insert 2 has a top side 11 and a bottom side 12 (see FIG. 2) between which a circumferential clearance surface 13 extends. In the example, the cutting insert is indexable by having a rhombic basic shape and two diametrically opposed nose portions 14a, 14b. At these nose portions, surface-wiping secondary or nose edges 15a, 15b are formed adjacent to the top side 11, each one of which edges transforms into two chip-removing main edges 16. The top side 11 is shown as a simple, planar surface, but may take other forms depending on application and design preference.

In the center of the cutting insert, there is a through hole 17 through which the shank 3a of the screw 3 can pass in order to be tightened in the threaded hole 10. In this case, the screw has a partially conical head 3b, which upon tightening of the screw is pressed against a conical seating surface in the upper part of the hole.

In the bottom side 12 of the cutting insert, engagement portions are formed, which are female-like in order to co-operate with the male-like engagement portions 8, 9, and which together form a second connecting surface 7b. Since the cutting insert is indexable, i.e., can be rotated 180° in order to allow use of either the nose edge 15a or the nose edge 15b, in this case the cutting insert is made with two similar sets of engagement portions 19a, 20a and 19b, 20b, respectively. When the nose edge 15a is indexed forward, as is shown in FIGS. 1 and 2, only the engagement portions 19a, 20a (see FIG. 5) are active (by the fact that the engagement portions 8, 9 engage the same), while the set designated 19b, 20b is inactive.

Figure 5:
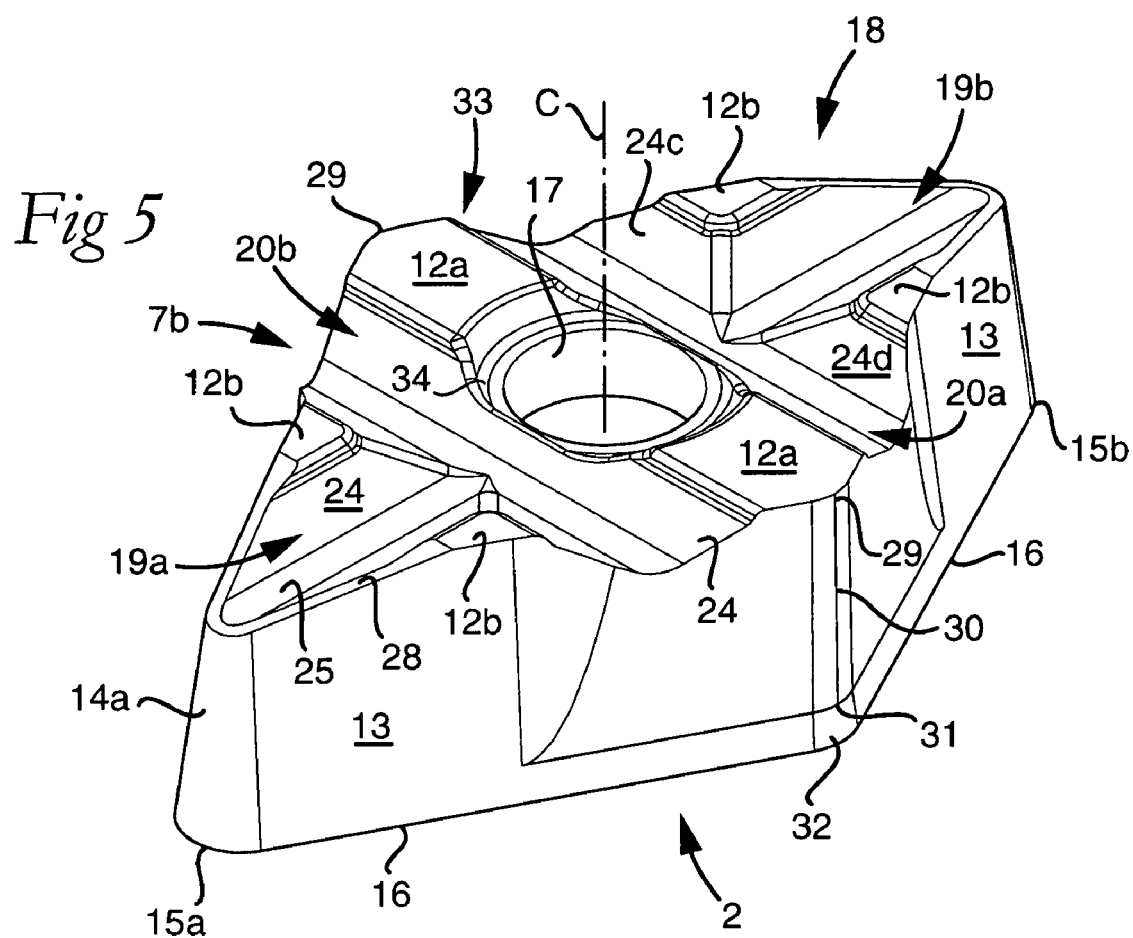
FIG. 5 is a perspective view showing a connecting surface on the bottom side of the cutting insert.

Reference being made to FIG. 5, it should be pointed out that the female-like engagement portions in the bottom side of the cutting insert are surrounded by a number of planar part surfaces 12a, 12b, which are situated in a common plane and together form the actual bottom side 12 of the cutting insert. The hole 17 and the geometrical center axis C thereof extend perpendicularly to the bottom side 12. Because the center axis of the hole 17 should coincide with the center axis of the threaded hole 10, when the screw is tightened, also the center axis of the hole 10 is designated C (see FIG. 2).

It should also be mentioned that, in this case, the top and bottom sides 11, 12 of the cutting insert are parallel to each other, and that the clearance surface 13 of the cutting insert is oriented at an acute angle (e.g., in the range of 70-90°) to the top side 11.

Before the invention is described more in detail, it should be pointed out that the tightening force that is applied to the cutting insert having the purpose of fixing the same is applied along the common, center axis C of the holes 17, 10. Thus, the center axis C forms a reference locus of the interaction of forces between the different engagement portions of the connecting surfaces.

The cooperating connecting surfaces 7a, 7b are of basic body 1 and the cutting insert 2 are specially designed. In particular, active engagement portions in the individual connecting surface 7a, 7b are of only two types—a first engagement portion (a ridge 8 in the connecting surface 7a and a groove 19a in the connecting surface 7b, respectively) that has a certain length extension and is located between a front end of the connecting surface and the center axis or the reference locus C, and a second, likewise generally elongate engagement portion (a ridge 9 in the connecting surface 7a and a groove 20a in the connecting surface 7b, respectively), which is oriented at an angle to the length extension of the first engagement portion (8 and 19a, respectively), and is located at a greater distance from said front end than the reference locus. Thus, in practice, one of the engagement portions in each connecting surface 7a, 7b is situated in front of the center axis C, while the other one is situated behind the same. Advantageously—though not necessarily—the angle between the two different engagement portions is right, i.e., 90°, whereby the engagement portions together form a genuinely T-shaped configuration. This is most clearly seen in FIG. 6, which schematically shows the location of the ridges 8, 9 included in the connecting surface 7a in relation to the hole 10 and the center axis C thereof (exactly the corresponding placement in relation to the center hole 17 also applies for the grooves 19a, 20a in the cutting insert).

Figure 6:
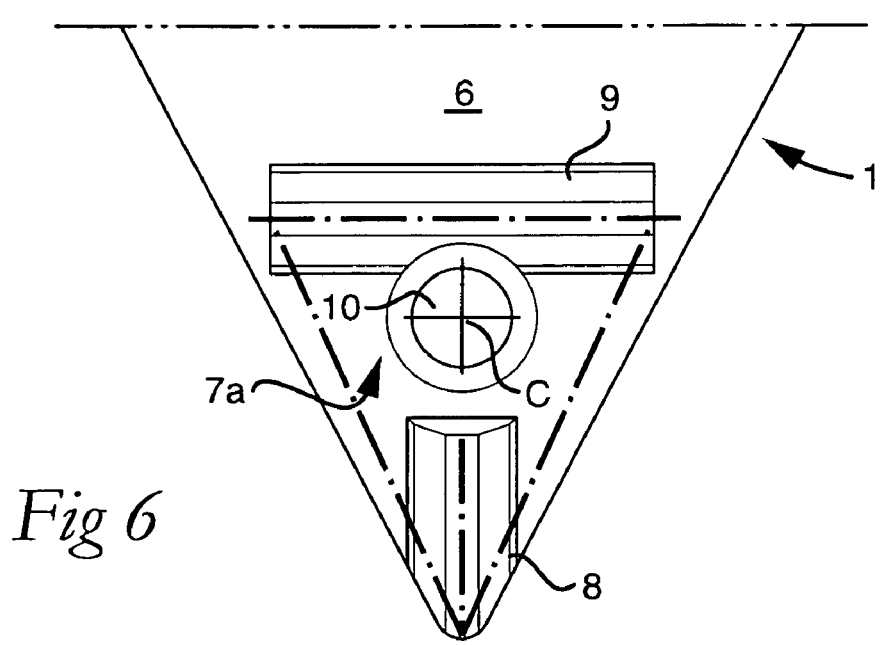
FIG. 6 is a simplified planar view, which schematically illustrates the general idea of the invention.
Figure 7:
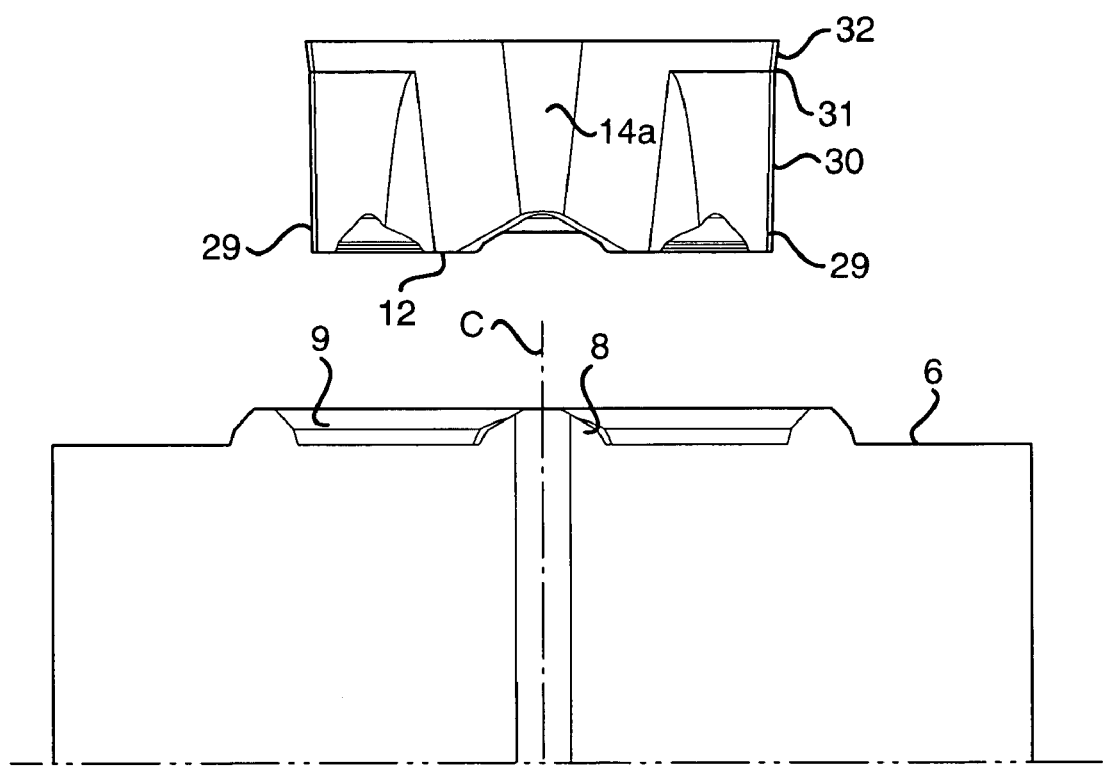
FIG. 7 is an end view of the cutting insert and the basic body.

In FIG. 6, the ridges 8, 9 are geometrically represented by simple dash-dotted lines, which form central, vertical planes in the ridges. Between the free ends of the ridges pointing outward, an imaginary triangular area indicated by dash-dotted lines is defined. In FIG. 6, it is clearly seen that the reference locus C is located within the triangle, more precisely at a point in front of the rear ridge 9 and behind the front ridge 8. In this connection, it should be pointed out that an extension of the ridge 8 may (but does not need to) intersect the rear ridge 9 at a point halfway between the two opposite ends thereof.

Figure 4:
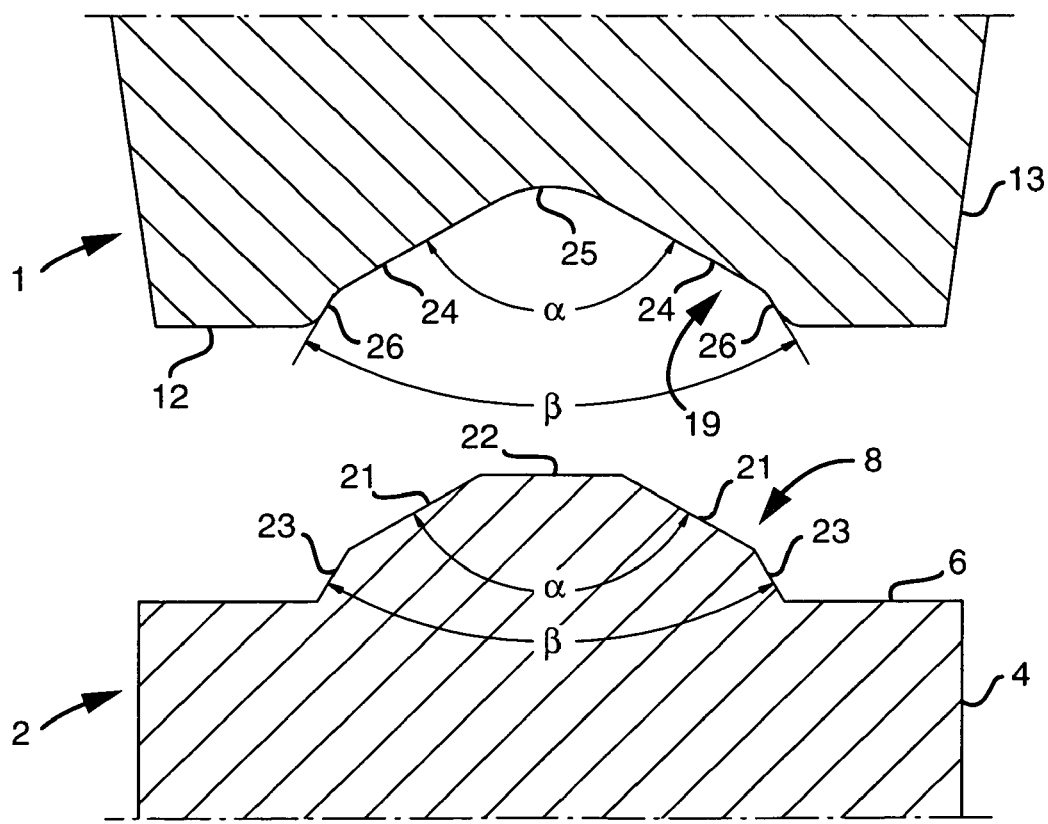
FIG. 4 is a section corresponding to FIG. 3 and showing the cutting insert and the basic body spaced-apart.

Reference is now made to FIGS. 3 and 4, which in detail illustrate the cross-section shape of the ridges and grooves serving as engagement portions. In the exemplified tool, the two ridges in the connecting surface 7a of the basic body have one and the same design, although the same also may be non-uniform. In an analogous way, the two grooves in each one of the two sets of grooves have one and the same cross-section shape, even if one of the grooves could have a cross-section shape that differs from the cross-section shape of the second groove. For these reasons, and for the sake of simplicity, only one ridge 8 and one groove 19 co-operating with the same are shown in FIGS. 3 and 4.

Generally, the ridge as well as the groove are cross section-wise V-shaped. Thus, the V-shape of the ridge 8 is determined by two laterally spaced-apart, lengthwise parallel flank surfaces 21, which in the example are planar and inclined at an angle $\alpha$ in relation to each other. Henceforth, the same surfaces are solely denominated "flanks". Between the flanks 21, the ridge has a highest situated intermediate surface 22, which in the example may (but necessarily does not need to) have the shape of a planar surface. At the bottom, the two flanks 21 transform into guide surfaces 23, which in turn transform into the planar surface 6 that surrounds the ridge. Like the flanks 21, the guide surfaces 23 are inclined in relation to each other, more precisely at an angle $\beta$. In FIG. 3, W 22 designates the width of the intermediate surface 22, while W 21 designates the width of the individual flank 21 (as viewed in vertical projection). In analogy hereby, W 23 constitutes a width measure of the guide surface 23, viz. seen in vertical projection. The height of the flank surface 21 is designated H 21, while the height of the guide surface 23 is designated H 23.

Like the shape of the ridge 8, the cross-section shape of the groove 19 is determined by two lengthwise parallel flanks 24, which in this case form one and the same angle $\alpha$ as the flanks 21. The two flanks 24 diverge from a common, concavely curved bottom surface 25 in the direction of a lower opening in flush with the planar bottom side 12 of the cutting insert. However, at a distance from the same opening, the flanks 24 transform into two inclined guide surfaces 26. In the example, the angle $\beta$ between the guide surfaces 26 is approximately equally large as the angle between the guide surfaces 23 on the ridge 8. In FIG. 3, the width of the bottom surface 25 is designated W 25, while the width of the individual flank 24 (as viewed in vertical projection) is designated W 24. The height of the flank surfaces 24, i.e., the level difference between the upper and lower limiting lines of the flanks, is designated H24. All flanks 21, 24 may advantageously—though not necessarily—be planar with the purpose of providing complete surface contact between the same, when the ridge engages the groove. It is also feasible to form the flank surfaces 24 with a somewhat larger angle than the angle between the flank surfaces 21. This angular difference should however not exceed 3°.

In FIG. 3, which shows the ridge engaging the groove, it is seen that the width W 25 of the bottom surface 25 is smaller than the width W 22 of the intermediate surface 22, as well as that the flanks 24 of the groove have a width W 24 that is larger than the width W 21 of the flanks 21 on the ridge. This means that the entire area (at least nominally) of the individual flank 21 abuts only against a certain part of the total area of the flanks 24. In FIG. 3, it is further seen that the horizontal distance between the guide surfaces 26 is somewhat greater than the corresponding distance between the guide surfaces 23 of the ridge. In such a way, the guide surfaces 23, 26 are not in contact with each other when the ridge engages the groove. It should also be noted that the depth of the flank pair 24 in relation to the bottom side 12 of the cutting insert is somewhat smaller than the height of the flank pair 21 in relation to the surface 6. Therefore, a play 27 arises between the surfaces 6 and 12. In other words, the cutting insert rides or rests on the ridge 8 only by contact via the flanks 24, 21, and without contact between the intermediate surface 22 and the bottom surface 25. Neither the guide surfaces 23, 26, nor the planar surfaces 6, 12, respectively, have any contact with each other.

In the shown, preferred embodiment, the angle α between the pairs of flanks 24, as well as the pairs of flanks 21, is obtuse. By selecting an obtuse angle instead of an acute one (e.g., 60°), the risk is reduced that the ridge cleaves or cracks the cutting insert. Furthermore, the force-carrying capacity of the flanks is improved. In the example, the angle α amounts to 120°, although the same may vary upward as well as downward from this value. However, the angle should amount to at least 90° and at most 160°.

If the flanks 24 should extend unbroken all the way up to the bottom side 12 of the cutting insert, it would be difficult for the operator to sense whether the cutting insert, in connection with exchange, assumes a correct, centerd position in relation to the ridge. For this reason, the grooves 19, 20 have, adjacent to the openings thereof in the bottom side of the cutting insert, been formed with the above-mentioned guide surfaces 26, which mutually form an angle β that is smaller than the angle α. Advantageously, the angle β is acute and may be in the range of 45-75° (e.g., 60°). As is clearly seen in FIG. 3, the same guide surfaces 26 lack contact with the guide surfaces 23 of the ridge when the ridge engages the groove, but in connection with the cutting insert being put in place and the guide surfaces 26 passing the turning lines between the flank surfaces 21 and the guide surfaces 23, a distinct indication is obtained, i.e., the operator senses that the cutting insert assumes the correct position.

It should be noted that in the example, the two flanks 24 of the groove 19a extend unbroken or continuously along the entire length of the groove. In other words, in the example shown, the flanks are planar surfaces, which are not interrupted by any countersinks or projections at all in the area between the front and rear ends of the flanks. In FIG. 5, it is further seen that the groove 19a ends or opens in the immediate vicinity of the nose 14a of the cutting insert. It is true that a thin V-shaped chamfer surface 28 is formed between the flank surfaces and on one hand the curved surface that forms the nose 14a, and on the other hand the two planar clearance surfaces 13 on both sides of the same, but nevertheless the front, tapering end portions of the flanks 24 will support the cutting insert also in the immediate vicinity of the nose. In this connection, it may be mentioned that the width of the chamfer surface 28 may be very limited, e.g., in the range of 0.01-1 mm.

Although it is feasible per se to form the grooves 19a, 20a with different cross-section shapes, in the example, the same have cross section-wise one and the same V-shape, as has been pointed out above. In the example, the second, rear groove 20a extends all the way between opposite side surfaces on the cutting insert, i.e., opens in the side surfaces of the cutting insert. Furthermore, the cutting insert shown has a positive basic geometry so far that the clearance surfaces 13 extend at an acute angle (e.g., in the range of 70-90°) to the top side or the chip surface 11. However, in the area halfway between the two noses of the cutting insert, the cutting insert is formed with side projections 29 (see FIGS. 5 and 7), which project laterally in relation to conceived extensions of the clearance surfaces on both sides of the cutting insert. These side projections 29 are delimited by edge portions 30, which extend at a right angle in relation to the bottom side 12 of the cutting insert. More precisely, the individual edge portion 30 extends up to an turning line 31, where the same transforms into a surface 32 having the same clearance angle as the clearance surface 13 otherwise. By the existence of the side projections 29, the groove 20 can be made to have a somewhat greater length than if the inclined clearance surface would extend unbroken all the way down to the bottom side of the cutting insert. In such a way, it is attained that the supporting capacity of the flanks 24 is optimized.

As has been mentioned above, the cutting insert is indexable and has therefore two sets of simultaneously active grooves 19a, 20a and 19b, 20b, respectively; viz. a set for each nose edge 15a and 15b, respectively. In this connection, each front active groove, e.g., the groove 19a, in one of the sets extends up to and opens in an inactive, transverse groove 20b in the other the set. Therefore, between the two transverse grooves 20a, 20b, a transverse, central crest 33 is delimited, in which the lower end of the hole 17 mouths. With the exception of a smaller cutout 34, the individual flank surface 24 adjacent to this crest 33 extends all the way between the two opposite sides of the cutting insert. However, the other flank surface in each transverse groove is broken through by the individual, longitudinal groove 19a, 19b, whereby the same flank surface is divided into two part surfaces 24c, 24d. The rear flank on the crest 33, which has to absorb the main part of the axial forces that act on the active nose edge of the cutting insert, has therefore a larger total area than the total area of the part surfaces 24c, 24d on both sides of an axial groove.

The two ridges 8, 9, which form the only engagement portions of the connecting surface 7a and which should co-operate with a pair of simultaneously active grooves in the cutting insert, have, as has been pointed out above, the same general V-shape cross section-wise as the grooves. The first, front ridge 8 adjacent to the nose 5 of the basic body extends from the nose to a rear end 35 (see FIG. 2) situated close in front of the hole 10. As is clearly seen in FIG. 1, the intermediate surface 22 of the ridge 8 ends in an arched turning line 36 adjacent to the curved surface of the nose. From the intermediate surface 22, the individual flank 21 slopes downward toward the guide surface 23 as well as toward an inclined, straight turning line 37 adjacent to the side surface 4 of the basic body 1. By this geometrical design, it is guaranteed that the part of the cutting insert that is subjected to the greatest stresses, viz. the front, active nose portion obtains satisfactory support on the bottom side of the cutting insert.

In the example, the transverse, rear ridge 9 in the connecting surface 7a extends unbroken all the way between opposite side surfaces 4 on the basic body. In other words, neither the flanks 21 in the ridge 9 (as well as neither the ridge 8) are interrupted by any countersinks or projections (with the exception of a diminutive cutout adjacent to the hole 10). This means that the flanks in all essentials can support along the entire surface thereof. In this connection, it should be pointed out that the ridge 9 very well also could be formed with a length that corresponds to (or is even somewhat smaller than) the length of the corresponding groove 20 in the cutting insert.

As is clearly seen in FIGS. 1 and 2, the ridge 9 (such as this is defined by a conceived vertical plane halfway between the flanks 21) is situated behind the center axis C of the threaded hole 10, i.e., at a greater distance from the nose 5 than the center axis C.

For the continued description of the invention, it should be made clear that all definitions of dimensions and geometries of the tool are of nominal character, so far that they relate to the conditions that apply before the beginning of use of the tool. Here, it is reminded that the cutting insert in practice is manufactured from a hard and comparatively shape-permanent material, such as cemented carbide, while the basic body is manufactured from a softer and more deformable material, usually steel. In practice, this means that minor deformations, above all in the basic body, may arise by so-called embossing, i.e., plastic deformation of certain detail surfaces. However, such embossing does not need to be negative. On the contrary, the same may—correctly handled—be utilized to optimize the properties of the tool.

Within the scope of the invention, it is fully possible to make the grooves 19, 20 in the connecting surface 7b of the cutting insert to have one and the same depth, at the same time as the ridges 8, 9 in the connecting surface 7a of the basic body have one and the same height. The depth of the grooves 19, 20 is determined by the situation of the flank pairs 24 inside the cutting insert, i.e., in relation to the bottom side 12 of the cutting insert (and indirectly the top side or chip surface in which the edges are located). In an analogous way, the height of the ridges 8, 9 is defined by the situation of the flank pairs 21 in relation to the surface 6. With equally deep grooves and equally high ridges, the planar surfaces 6, 12 on both sides of the gap 27 (see FIG. 3) will be located parallel to each other. However, suppose that a smaller form defect would arise near the front end of the ridge 8 and a co-operating, axial groove 19, respectively. Then the nose edge could risk being located higher than desirable.

In order to manage the above-mentioned risk, according to the invention, the possibility of "tipping" the cutting insert slightly forward is envisaged. This may in practice take place either by the fact that the rear ridge 9 in the connecting surface 7 is made somewhat higher than the front ridge 8, or by the fact that each rear groove 20 is made somewhat shallower than the co-operating, front groove 19 (or a combination of both of these measures). In such a way, it is guaranteed that the cutting insert at least initially always rests with the front groove in contact with the outermost, front portion of the ridge 8. Even if said level difference between the ridges, or difference in depth between the grooves, is made very moderate, e.g., of the order of 0.005-0.2 mm, the effect is attained that a point-wise contact arises in the immediate vicinity of the nose, after which the flanks successively clear from each other in the rearward direction. However, when the tool is begun being used, this clearance is eliminated entirely or partly by the tightening force that is applied to the cutting insert via the screw 3. Thus, the pressure from the hard cutting insert embosses the softer material in the ridge 8 so that the flanks 21, 24 finally obtain great or complete surface contact.

The nominal dimensions of the cutting insert and the basic body may be such that the gap 27 (see FIG. 3) between the bottom side 12 of the cutting insert and the surface 6 becomes about 0.10 mm. In such a way, it is guaranteed that the cutting insert exclusively is carried by the flanks 24 pressed against the flanks 21, i.e., without the cutting insert bottoming against the surface 6. However, within the scope of the invention, it is feasible to reduce the gap 27 to, for instance, the order of 0.03-0.05 mm. In such an embodiment, suitable embossing of the ridges allows the bottom surface of the cutting insert to set down and be pressed against the surface 6 in order to entirely or partly rest against the same. In this connection, it should be pointed out that such a moderate pressing of the bottom side of the cutting insert against the planar surface 6, which surrounds the ridges, does not result in the rotation-securing and position-determining capability of the engagement portions being lost.

Figure 8:
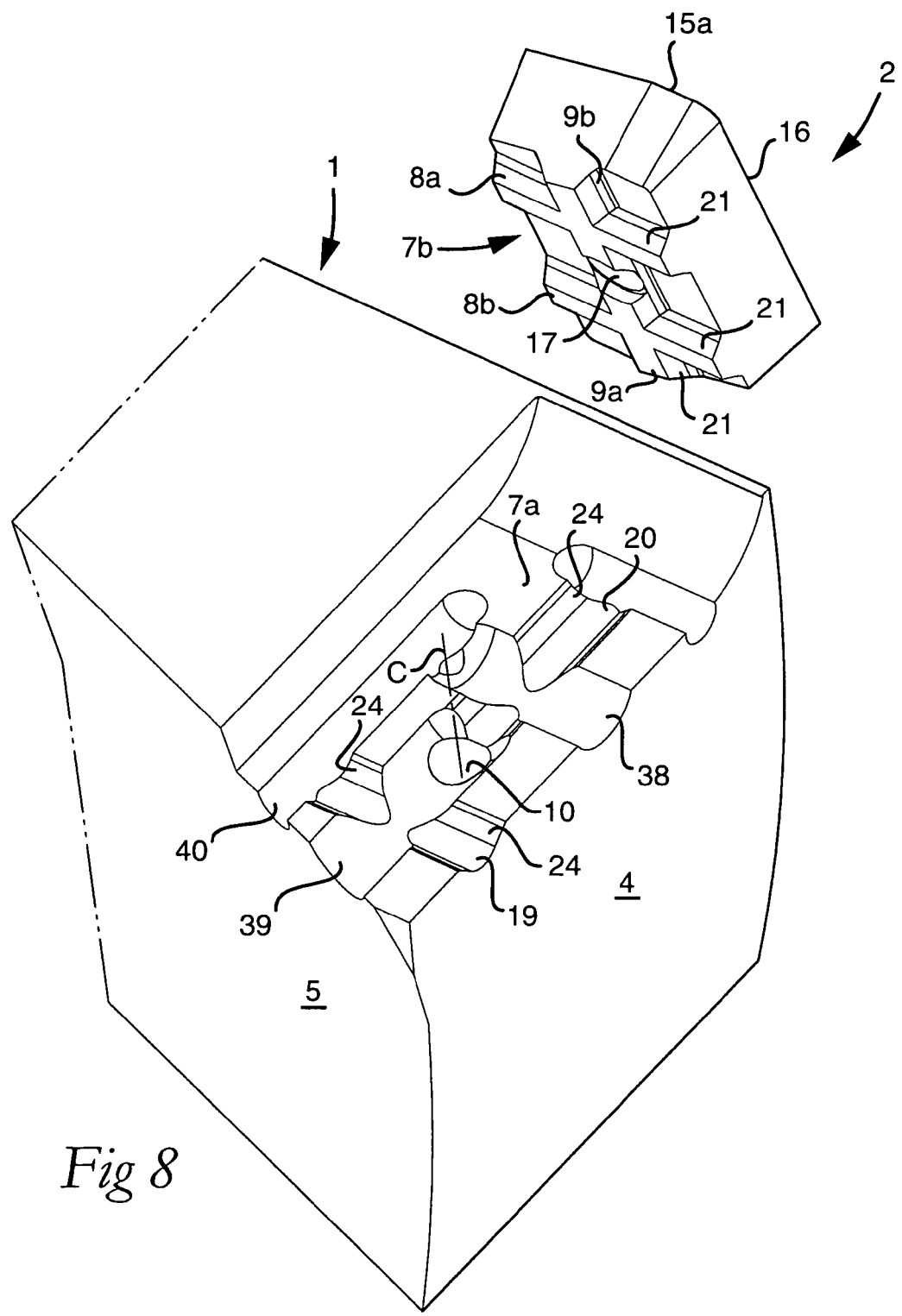
FIG. 8 is an additional perspective exploded view showing an alternative embodiment of a tool in the form of a milling tool.
Figure 9:
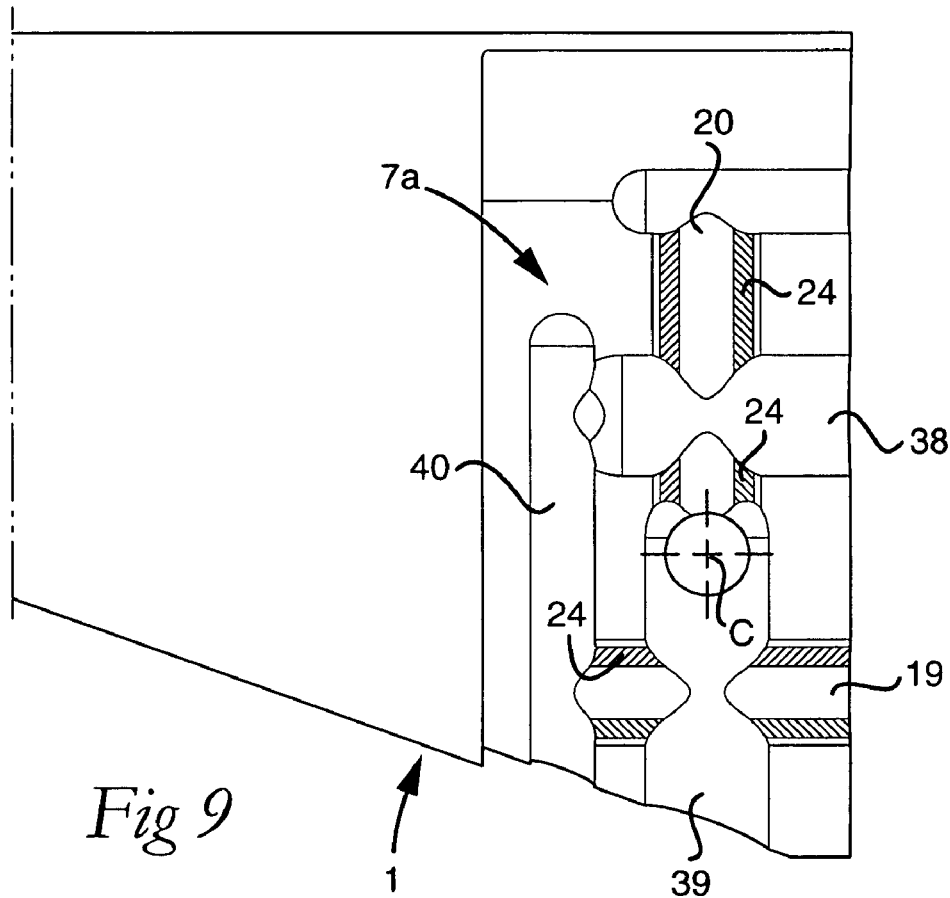
FIG. 9 is a planar view from above of a basic body (and the insert seat thereof) included in the tool according to FIG. 8.
Figure 10:
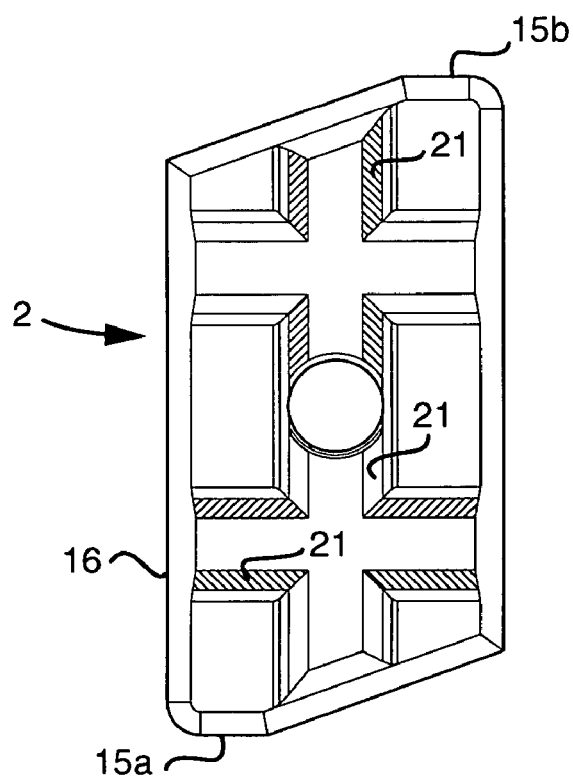
FIG. 10 is a planar view from below of a cutting insert included in the tool according to FIG. 8.

Reference is now made to FIGS. 8-10, which illustrate an alternative embodiment of a cutting insert and a cutting tool, which is suitable for milling or another rotary machining of stationary workpieces. In the drawings, analogous details have the same reference designations as in FIGS. 1-7. Thus, numeral 1 designates a basic body and 2 a cutting insert. The basic body may, for instance, be a part of a rotary cutter head. A connecting surface 7a formed in the basic body 1 co-operates with a corresponding connecting surface 7b underneath the cutting insert. The cutting insert has a front edge 15a in the form of a secondary or wiper edge, which transforms into a longer main edge 16. Like the earlier described turning insert, the cutting insert 1 is fixed by means of a screw (not shown), which is inserted through a central hole 17 and is tightened in a threaded hole 10 in the basic body. A surface situated in front of the hole 10 is designated 5, while a surface present on the basic body and positioned beside the connecting surface 7a is designated 4 (by analogy with the designations 5, 4 in FIG. 1). In a face mill, the connecting surface 7a serving as an insert seat is formed in a corner between a cylindrical envelope surface and a planar bottom side of a cutter head, the schematically shown surface 4 constituting the envelope surface and the surface 5 the bottom side.

Also in this case, the reference locus in which force is applied to the cutting insert is the common center axis C of the holes 10 and 17. Another similarity between the two alternative embodiments of the tool and the cutting insert, respectively, is that the two co-operating connecting surfaces include male- and/or female-like engagement portions intended to engage each other. However, in this case, the male-like engagement portions, more precisely in the form of ridges 8, 9, are located on the bottom side of the cutting insert 2, while the female-like engagement portions in the form of grooves 19, 20 are formed in the connecting surface or insert seat 7a of the basic body.

An additional similarity between the turning insert according to FIGS. 1-7 and the milling insert according to FIGS. 8-10, is that both are indexable. Thus, two diametrically opposed front edges 15a, 15b of the cutting insert (see FIG. 10), are alternately usable. For this reason, the cutting insert has two sets of simultaneously active ridges 8a, 9a and 8b, 9b, respectively. All ridges may be equally thick and have the same V-like cross-section shape, by including pairs of oblique flanks 21. One type of the ridges, viz. the ridges 9a, 9b, extend axially, i.e., parallel to the length extension of the cutting insert, while the other ridges 8a, 8b, extend perpendicularly to the first-mentioned ones. In the same way as above, one of the ridges in each pair of simultaneously active ridges, for example the ridges 8a and 9a, is situated on both sides of the reference locus C. However, contrary to the earlier embodiment, the milling insert is formed with the transverse ridge 8a thereof situated between the reference locus C and the front edge 15a of the cutting insert, while the axial ridge 9a is situated behind the reference locus. Generally, also these two co-operating ridges still form a T-like configuration.

In the connecting surface 7a, only one pair of active grooves is included, viz. the grooves 19 and 20. In order to carry the cutting insert via the flanks 21, these grooves 19, 20 are formed with co-operating pairs of flanks 24. Transverse to the axial groove 20, a flute designated 38 extends. In an analogous way, a flute 39 extends perpendicularly to the groove 19. One end of the flute 38 mouths in the side surface 4, while the opposite end mouths in a third flute 40 that is parallel to the flute 39. The flutes 38, 39 are inactive by being deeper and wider than the grooves 19, 20 formed with flanks 24. Thus, the only purpose of the flutes 38, 39 is to house the pair of inactive ridges on the cutting insert. In the state assumed by the cutting insert in FIG. 8, the flanks 21 of the transverse, front ridge 8a will accordingly be brought into contact with the flanks 24 of the groove 19, at the same time as the flanks 21 of the rear ridge 9a are pressed against the flanks 24 of the groove 20. However, no parts at all of the ridges 8b, 9b will be in contact with the surfaces that delimit the flutes 38, 39.

A fundamental advantage of the invention—irrespective of it being applied in connection with turning, milling or another type of machining—is that the co-operating connecting surfaces, by the design thereof, always guarantee a stable fixation of the cutting insert in the desired position in relation to the basic body. This occurs by the fact that the cutting insert generally obtains a three-point support against the insert seat, in that the tightening force against the cutting insert is applied within a conceived triangle (see FIG. 6), the shape of which is defined by the free ends of the T-configuration. Even if minor form defects would arise in (above all) the cutting insert and/or the insert seat, the cutting insert will in a auto-seeking way assume a position in which the same is rigidly supported in the insert seat and secured in respect of the possibilities of being angularly displaced, in that neither more or less than two engagement portions in one of the components are brought into engagement with a corresponding number of engagement portions in the other component. In other words, the connecting surfaces do not include any third or additional engagement portions, which could cause overdetermination of the position of the cutting insert and give rise to the same wobbling or in another way unintentionally moves in relation to the insert seat.

Furthermore, it should be pointed out that the distance between the tip or front edge of the cutting insert and the rear engagement portions is the shortest possible. If a form defect would arise in the cutting insert as a consequence of the same, in connection with sintering, shrinking in not an exact predetermined way (something which propagates percentage-wise all through the cutting insert) the short distance between the front edge and the rear engagement portions guarantees that the actual error becomes minimal. Another advantage is that the tightening force of the screw (or of a clamp) is applied genuinely axially along the geometrical center axis perpendicularly to the plane of the cutting insert. Contrary to such screws (offset screws) that apply a lateral prestress to the cutting insert, the solely axially acting screw according to the invention will therefore clamp the cutting insert by a considerably greater force. It should also be noted that the transverse engagement portions, e.g., the rear ridge in the insert seat of the first described turning tool, prevents the cutting insert from moving not only in the backward direction, but also in the forward direction, more precisely by including two opposite flanks, the front one of which carries forces directed rearward and the rear one carries possible forces directed forward.

The individual engagement portions—irrespective of the same including a ridge or a groove—does not necessarily need to extend unbroken between the opposite ends thereof, i.e., have one and the same shape in all arbitrary cross sections along the entire length thereof. Reference being made to the turning tool described by way of introduction, it is thus feasible to modify the connecting surfaces in such a way that the rear, transverse ridge in the connecting surface of the basic body is formed with a certain cross-section shape in the area of the opposite ends thereof, but another, lower and more slender cross-section shape in a central area therebetween. If the co-operating, rear groove in the cutting insert simultaneously has one and the same cross-section shape out along the entire length thereof, the cutting insert will therefore abut against the rear ridge only along the end portions thereof, but lack support in the central area of the ridge. In other words, the rear part of the cutting insert obtains support in two laterally distinctly spaced-apart points or areas. Conversely, it is also feasible to let an unbroken ridge co-operate with a groove, which at the opposite ends thereof has a certain, relatively shallow cross-section shape, but a deeper section between the ends. Also in this case, only end portions of the two flanks of the groove will be pressed against the flanks of the ridge. In this connection, it should also be mentioned that the male-like engagement portion does not necessarily have to be realized in the form of a continuous ridge. For instance, it is feasible to form two or more projections in a row one after the other, the important thing being that pairs of flanks on the projections contact flanks in a co-operating groove.

Figure 11:
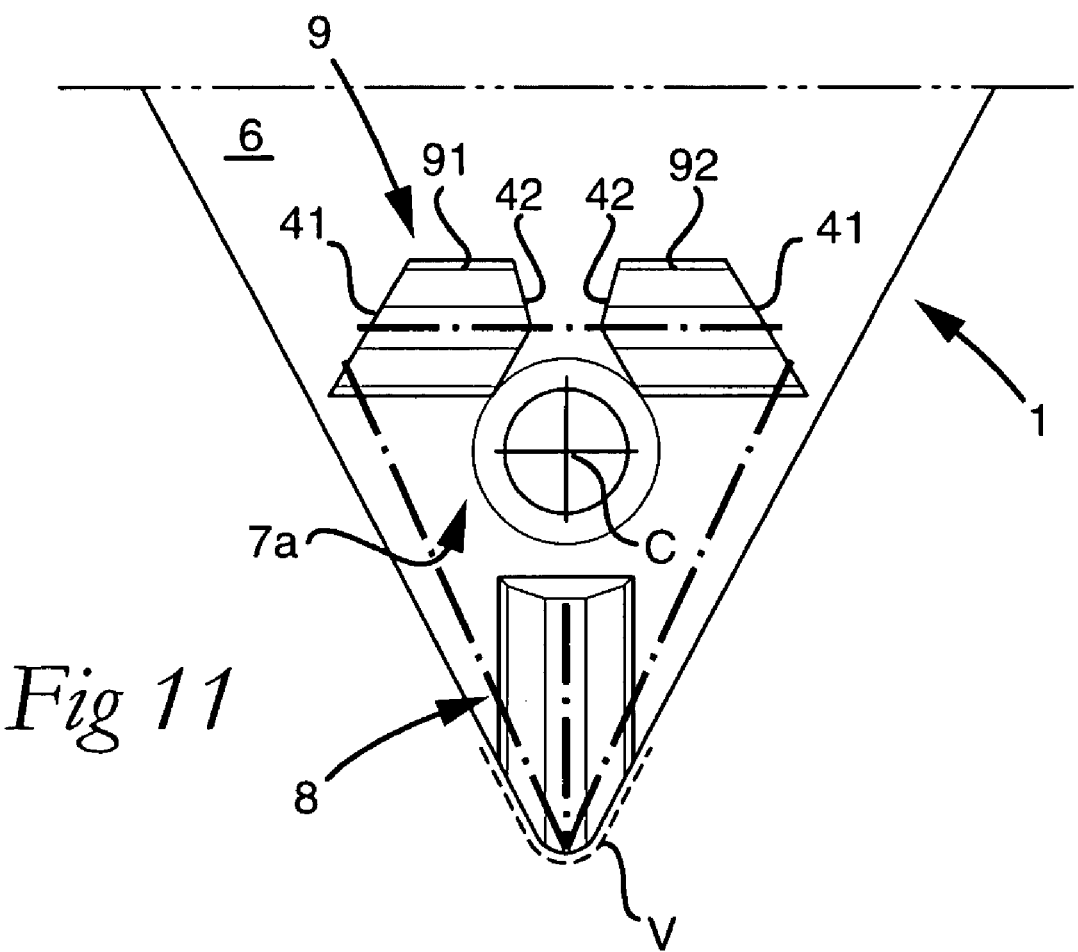
FIG. 11 is a schematic planar view corresponding to FIG. 6 and showing an alternative detailed design.

Reference is now made to FIG. 11, which like FIG. 6 is schematic, and which illustrates an alternative embodiment of a connecting surface 7a. In this embodiment, the rear, transverse engagement portion 9 is realized in the form of two part ridges or male elements 91, 92, which per se are spaced-apart, but which are located along a common straight line and therefore together—in functional respect—form one and the same engagement portions. In the embodiment according to FIG. 6, it is true that the ridge 9 is continuous, but in practice, supporting surface contact is established only along the portions of the male flanks 21 against which the female flanks 24 are pressed. In order to adapt the tool better to this fact, the two part ridges 91, 92 have been given a shape that substantially corresponds to the shape of the female flanks that de facto are pressed against the flanks of the part ridges. Thus, the end surfaces 41 facing away from each other are obliquely cut, while the ends 42 facing each other have a V-shaped contour.

In FIG. 11, by means of a dashed line V, it is outlined how the active nose portion of the cutting insert could protrude by a certain, limited overmeasure in relation to the nose portion of the basic body. This corbelling, which may be of the order of 0.005-0.2 mm, guarantees that the lower edge that defines the front end of the active groove 19 does not penetrate into and deform the front portion of the ridge 8.

In an analogous way, also the transverse, rear groove 20 in the cutting insert may be made to have a length that somewhat exceeds the length of the ridge 9 shown in FIG. 11 (such as the same is defined as the distance between the end surfaces 41).

The invention is not limited to the embodiments described above and illustrated in the drawings. On the contrary, a plurality of alternative embodiments are feasible within the scope of the subsequent claims. For instance, instead of two similar engagement portions in the individual connecting surface, two different engagement portions may be used. In other words, one of the connecting surfaces may include a male-forming ridge for engagement in a groove in the co-operating connecting surface, as well as a groove for engagement with a ridge in the other connecting surface.

Furthermore, at least one of the two pairs of co-operating male- and female-like, respectively, engagement portions may be made having another contour shape than the shown, straight contour shape. For instance, the illustrated turning tool could be formed with a slightly curved rear ridge in the insert seat of the basic body for co-operation with a correspondingly curved rear groove in the cutting insert.

It should also be mentioned that the rear engagement portions (e.g., the transverse ridge 9 in the turning tool according to FIGS. 1-7) may be located fairly near the reference locus C, provided that the same does not reach up to the reference locus. Thus, the distance between the reference locus and the center plane of the ridge 9 (see FIG. 6) should amount to at least 0.1 mm, suitably at least 1 mm.

It is also feasible to apply the invention to tools that make use of round cutting inserts. In this case, the front cutting edge is the limited portion of the endless edge that is loaded by actively machining a workpiece.

In conclusion, it should be pointed out that the turning and milling inserts, respectively, shown as examples, have the edges thereof located in a plane that is parallel to a connecting surface on the bottom side of the cutting insert. However, the invention is also applicable to cutting inserts mounted on end, e.g., for parting and grooving operations. In this case, a front edge may extend between two opposite sides (mounted on end), one of which is formed with a connecting surface according to the invention, i.e., the edge extends at an angle, e.g., right angle, to the side on which the connecting surface is located.

The invention claimed is:

1. A cutting insert for cutting tools of the type that includes a basic body, comprising:
   a front cutting edge and a connecting surface having male- and/or female-like engagement means for securing the cutting insert in a mounted state, each of the engagement means comprises a pair of flanks, which extend parallel and are inclined at an angle to each other while giving the engagement means a v-shaped cross section, said flanks contacting a corresponding pair of flanks of a mating engagement means in a connecting surface of the basic body so as to secure the cutting insert in a mounted state but not at an intermediate surface spacing the flanks apart, a geometrically predetermined reference locus in the cutting insert serving as a force-application spot for the clamping of the cutting insert, wherein simultaneously active engagement portions, consisting of: a first engagement means, which has a certain length extension and is entirely located between said front cutting edge and the reference locus, and a second elongate engagement means, which is oriented at an angle to the first engagement means, and is entirety situated at a greater distance from the front cutting edge than the reference locus.

2. The cutting insert according to claim 1, wherein the angle between said first and second engagement means is right, the engagement means together forming a T-shaped configuration.

3. The cutting insert according to claim 1, wherein individual engagement means comprises two spaced-apart flanks, which extend parallel and are inclined in relation to each other while forming a V-like cross-section shape, the angle a between the flanks being obtuse.

4. The cutting insert according to claim 3, wherein the engagement means is a female-like groove, the two flanks of which diverge from an intermediate surface separating the flanks toward an opening in one side of the cutting insert, guide surfaces extending between the flanks and said opening, said guide surfaces being mutually inclined at an angle, which is smaller than the obtuse angle between the flanks.

5. A cutting insert for chip removing machining, comprising:
   a front cutting edge and a connecting surface having male- and/or female-like engagement means for securing the cutting insert in a mounted state, a geometrically predetermined reference locus in the cutting insert serving as a force-application spot for the clamping of the cutting insert, wherein simultaneously active engagement portions are of only two types, a first engagement means, which has a certain length extension and is entirely located between said front cutting edge and the reference locus, and a second elongate engagement means, which is oriented at an angle to the first engagement means, and is entirety situated at a greater distance from the front cutting edge than the reference locus, in the form of a turning insert in which said front cutting edge is a surface-wiping secondary edge formed adjacent to a tapered nose, which secondary edge transforms into at least one chip-removing main edge, wherein the first engagement means is a groove, which extends in the direction from the nose toward the reference locus.

6. The cutting insert according to claim 5, wherein said first groove is delimited by two V-shaped inclined flanks, which generally extend unbroken or continuously along the entire length of the groove.

7. The cutting insert according to claim 5, wherein the first groove opens in said nose.

8. The cutting insert according to claim 5, wherein also the second engagement means is a groove having generally V-shaped cross section.

9. The cutting insert according to claim 8, wherein said groove extends all the way between two opposite sides of the cutting insert.

10. The cutting insert according to claim 9, wherein a clearance surface extends at an acute angle to a top side on the cutting insert, wherein the cutting insert, adjacent to the second groove, has side projections that project in relation to the clearance surface.

11. The cutting insert according to claim 5, wherein the first and second grooves are at different depths with respect to the level of the flank pairs in relation to the bottom side of the cutting insert.

12. The cutting insert of claim 11, wherein the pair of flanks in the first groove is situated deeper into the cutting insert than the flank pair in the second groove.

13. The cutting insert according to claim 5, wherein the cutting insert is indexable by including two diametrically opposed noses and secondary edges associated thereto, the connecting surface of the cutting insert including two pairs of engagement means individually co-operating with the respective secondary edges.

14. The cutting insert according to claim 1, in the form of a cutting insert intended for milling and/or drilling, wherein the first engagement means, positioned between the front cutting edge and the reference locus, is a ridge.

15. The cutting insert according to claim 14, wherein the second engagement means is a ridge that extends from the area of the reference locus and in the backward direction from the same.

16. The cutting insert according to claim 1, wherein the reference locus that decides where a tightening force is applied to the cutting insert is a geometrical center axis in a through hole for a tightening screw.

17. A tool for chip removing machining, comprising:
   a basic body having an insert seat and a replaceable cutting insert, which is mounted in the insert seat by means of a tightening element, the cutting insert and the insert seat including co-operating connecting surfaces, each one of which has male- and/or female-like engagement means having the purpose of rigidly securing the cutting insert in a mounted state, each of the engagement means comprises a pair of flanks, which extend parallel and are inclined at an angle to each other while giving the engagement means a v-shaped cross section, said flanks contacting a corresponding pair of flanks of a mating engagement means in a connecting surface of the basic body so as to secure the cutting insert in a mounted state but not at an intermediate surface spacing the flanks apart, and the tightening element directly or indirectly defining a geometrically predetermined reference locus in which a tightening force requisite for the clamping of the cutting insert is applied to the cutting insert, wherein simultaneously active engagement means in the individual connecting surface, consisting of: a first generally elongate engagement means, which is located between a front end of the connecting surface and said reference locus, and a second, likewise generally elongate engagement means, which is oriented at an angle to a length extension of the first engagement means, and located at a greater distance from said front end than the reference locus.

18. The tool according to claim 17 in the form of a turning tool, the basic body as well as the cutting insert having tapering noses, wherein at least the first engagement means, positioned between a front edge of the cutting insert and the reference locus, in the connecting surface of the cutting insert is female-like, while the corresponding first engagement means in the connecting surface of the basic body is male-like.

19. The tool according to claim 18, wherein both engagement means in the connecting surface of the cutting insert are grooves, and that both engagement means in the connecting surface of the basic body are ridges, the front and rear ridges of the connecting surface of the basic body being differently high in respect of the level of a pair of flanks in relation to a planar bottom surface surrounding the ridges.

20. The tool according to claim 19, wherein the pair of flanks of the front ridge is situated lower than the flank pair of the rear ridge.

21. The tool according to claim 17 in the form of a rotatable tool, wherein at least the first engagement means, positioned between the front edge of the cutting insert and the reference locus, in the connecting surface of the cutting insert is male-like, while the corresponding first engagement means in the connecting surface of the basic body is female-like.

22. The tool according to claim 21, wherein the male-like engagement means in the connecting surface of the cutting insert is a ridge, which extends substantially parallel to the front edge of the cutting insert, while the female-like engagement means in the connecting surface of the basic body is a groove.

23. The tool according to claim 17, wherein a part of the connecting surface of the cutting insert that surrounds the engagement means, as well as a part of the connecting surface of the basic body that surrounds the engagement means thereof, are planar, a flank height of the ridges being chosen in such a way in relation to a flank depth of the grooves that between the planar surface parts, as long as the cutting insert is unloaded, a gap arises.

24. The tool according to claim 23, wherein the relation between the flank height of the ridges and the flank height of the grooves is proportioned in such a way that a height of the gap amounts to at least 0.03 mm and at most 0.10 mm.

* * * * *